Aug. 10, 1943.　　　W. H. RITCHIE　　　2,326,566
AUTOMOBILE LICENSE PLATE
Filed Oct. 2, 1941
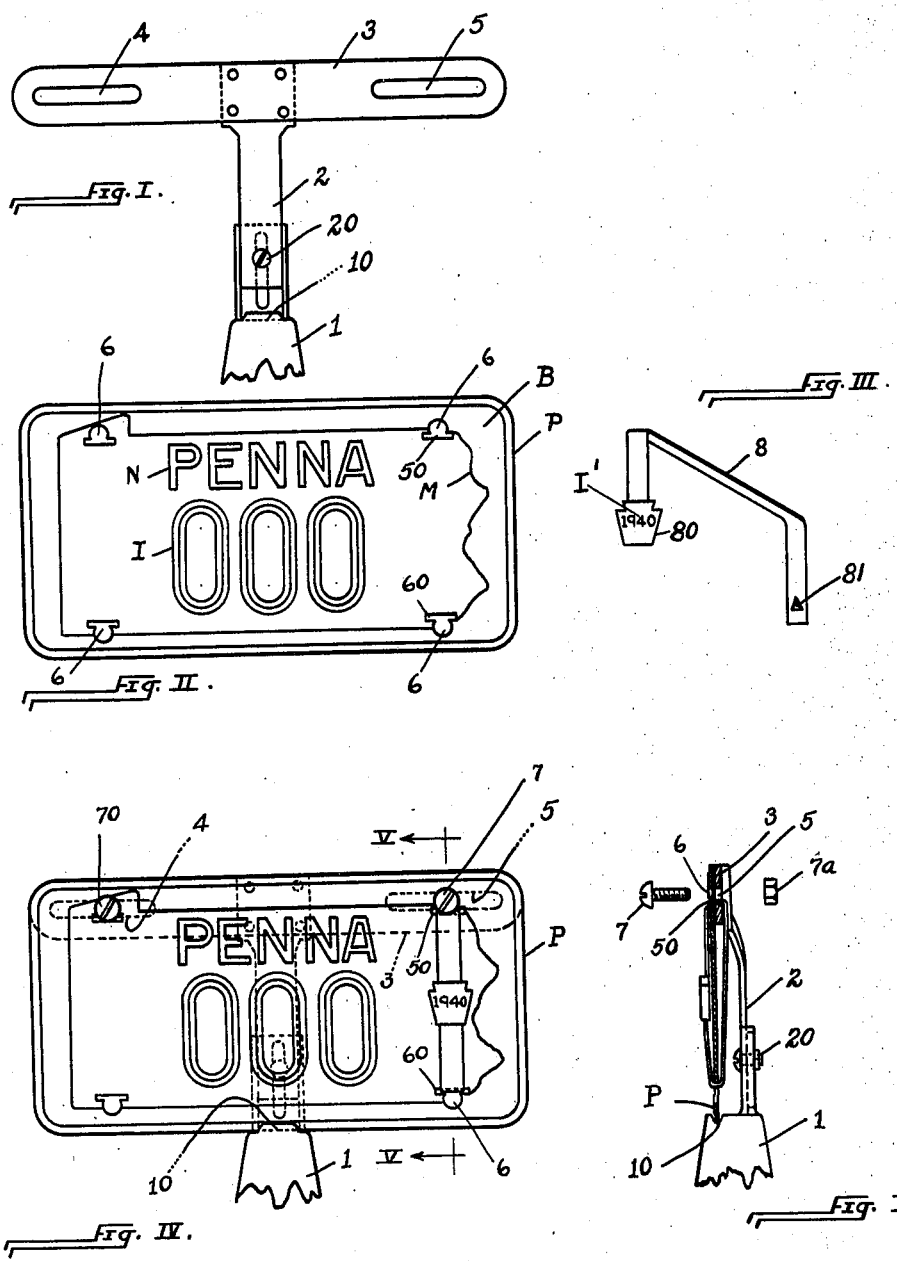
INVENTOR
William H. Ritchie
by Christy and Wharton
his attorneys Patented Aug. 10, 1943

2,326,566

UNITED STATES PATENT OFFICE 2,326,566

AUTOMOBILE LICENSE PLATE

William H. Ritchie, Chicago, Ill., assignor of one-half to Jessie H. Ritchie, Pittsburgh, Pa.

Application October 2, 1941, Serial No. 413,343

1 Claim. (Cl. 40—125)

My invention relates to license plates and tags, particularly to the license plates of automobiles.

In certain States the practice exists of employing a compound license plate. The main body of the plate bears the license number, and an auxiliary body, carried by the main body, bears particular indicia, ordinarily the number of the year. From year to year the main plate continues in use, and the subsidiary plate is replaced, to indicate the fact of renewal of license. It is manifest that, while the number that the main plate bears is a distinctive number, the date that the auxiliary plate bears has nothing distinctive about it. In such circumstances lies the opportunity of fraudulent exchange of the auxiliary plate, and of evasion of license law without detection.

In order to prevent such fraudulent exchange of the auxiliary plate, the use of seals has been proposed, after the manner that seals are used on voting machines and on railway cars. In accordance with one of such proposals slots are provided in the bodies of the main and auxiliary plates, and the ribbon-like metal body of a seal is threaded through such slots and the plates laced together. The ends of the ribbon of metal are brought together and sealed. When once the ribbon of metal has been brought to position and its ends sealed, it can be removed only by its own destruction, and thus the subsidiary plate can not be fraudulently transferred from one plate to another.

My invention consists in certain refinements in the structure and organization of such a seal in a license plate installation. First, the ribbon-like body of the seal is adapted to serve as the auxiliary, indicia-bearing member of the compound license plate. Second, the indicia-bearing seal provides a tamper-proof attachment of the license plate to the bracket on which the plate is mounted on an automobile. Third, the structure of the plate and the organization of the seal are such that no modification is required in the form of the plate-supporting brackets now in use on motor vehicles. More particularly, the invention consists in structural refinements, by virtue of which all three of these advantages are enjoyed.

An embodiment of the invention is illustrated in the accompanying drawing, in which—

Figure I is a view in front elevation of a typical license-plate-supporting bracket;

Figure II is a view of the face of a license plate that has been structurally adapted for the assembly of the invention;

Figure III is a view of the indicia-bearing seal used in the assembly;

Figure IV is a view in front elevation of the assembly of license plate and seal upon the supporting bracket; and Figure V is a sectional view of the assembly, taken on the plane V—V of Figure IV.

The bracket that supports the license plate P is, as shown in Figure I, of conventional form, including a basal portion 1 that is rigidly secured to the mud-guard, or tail-light housing, or other convenient part of an automobile body. The basal portion 1 provides a rigid foot for a telescopic leg 2, upon the upper end of which leg a rigid cross-arm 3 is secured. The cross-arm is provided at its opposite ends with the usual horizontally aligned slots 4 and 5 for the reception of plate-securing bolts or screws, and the basal portion 1 includes a notch 10, to receive the lower edge of the plate, as will presently appear.

The license plate P may, with the refinement hereinafter described, be of common and well-known form, consisting in a rectangular body of sheet metal, embossed and painted, with the distinctive indicium I (the license number), and the legend N and map M of the licensor State displayed in relief and contrasting color. In accordance with usual practice four bolt holes 6 are provided in the plate, although only the upper two are ordinarily used.

Preferably, I form the plate of sheet aluminum, and, with the body of the plate, otherwise coated with paint of suitable color, the areas that form the faces of the characters I and N and the border B of the map are left exposed. In these areas the bright, non-corrosive metallic surface of the aluminum sheet provides the desired color contrast with the painted areas of the plate, and, additionally, serves to reflect light in such manner that the indicia borne by the plate are more readily discernable. A more detailed description of this preferred form of plate will be found in United States Letters Patent No. 2,182,919, granted December 12, 1939 to Arthur S. Hainsworth.

In the mounting of the license plate upon the supporting bracket, the leg 2 of the bracket is telescopically adjusted and secured (by means of screw 20), in such position that, when the license plate is positioned with its lower edge in slot 10 in the basal portion 1 of the bracket (cf. Figures IV and V), the two upper bolt holes 6 in the plate are vertically centered with the slots 4 and 5 in the bracket arm 3. Then the plate is, by means of bolts 7 and 70, secured to the bracket arm, such being the installation as hitherto made.

At variance with such prior practice, I provide a device for sealing the license plate in installed position upon the bracket, and in accordance with the invention such sealing device, requiring no modification in the structure of the plate-supporting bracket, provides the auxiliary indicia-bearing tag of a compound license plate of the sort alluded to in the introduction to this specification. More specifically, the sealing device includes a ribbon 8 of metal, together with means for sealing or permanently securing the ends of the ribbon together.

The means for permanently uniting the ends of the ribbon may be of various known forms. A medallion of lead of the sort long used in uniting the ends of a looped wire seal will serve. Alternately, and as shown in this case, the ribbon 8 is provided at one end with a triangular tang 81, cut on two sides of the triangle from the body of the ribbon, and bent on the uncut side of the triangle from the plane of the ribbon. At its opposite end the ribbon carries integrally a small casing 80, that includes a lock adapted to receive the free end of the ribbon and engage the tang 81. The lock within the casing 80 is not shown; it is a known structure, and particular consideration of it is not essential to an understanding of my invention. Indeed, the sealing device 8, 80, 81 is in its entirety a substantial duplication of a form of freight car seal now used by the American railroads.

The sealing device carries such an indicium as the number of the year embossed upon it, and in this case the indicium is borne by the wall of the casing 80. (Note the reference character I' in Figure III of the drawing.) The license plate P carries the distinctive indicium I—the license number; the ribbon 8 carries the number of the year for which the license is effective; and together the plate and the ribbon carry the legally required display of license data.

To the ends in view the license plate is provided with two vertically spaced-apart slots 50 and 60. In mounting the plate, before the bolt 7 is inserted and tightened, the indicium-bearing ribbon 8 is threaded through the slots 50 and 5 in the plate and the bracket arm, and, carried downward at the back of the plate, is threaded through the slot 60. Next, the two ends of the ribbon are brought together at the front of the plate and sealed, and then the bolt 7 is inserted and secured.

When the ribbon 8 has been laced through the perforations in the plate and bracket, and its ends have been permanently locked or sealed together, the bolt 7 is inserted in the openings 5 and 6, and the nut 7a (Figure V) applied and tightened. Thus, removal of the license plate from the bracket and fraudulent exchange of the date-bearing member of the assembly can not be accomplished without destruction of the seal.

While the indicium I' is shown on the wall of the lock casing 80, I have in mind such indicium may be also, or alternately, carried by the ribbon-like body 8 of the sealing device.

It will be perceived that the seal-receiving slots 50 and 60 consist, actually, in lateral enlargements of two of the bolt holes 6 already provided in the standard license plate, so that in the practice of my invention no other perforation of the plate is required than is customary. Alternately, the slots 50 and 60 may be omitted, and the ribbon-like body of the seal threaded through two of the spaced-apart bolt holes 6. In either case the bolt 7, tightened in place, engages the ribbon-like body 8 of the seal, and assists in securing the seal in installed position. It is further important to note that, in sealing the plate to the bracket, I utilize the slot 5—a structural provision that is present in the usual plate-supporting brackets of automobiles.

While I have described aluminum as the preferred material of which to construct the plate P, I contemplate forming the plate of plastic material, say urea formaldehyde, including a suitable color pigment or opacifier that will clearly contrast with the color of the indicia applied to the face of the plate.

Notice is hereby given of an application, Serial No. 285,065, filed by me July 18, 1939.

I claim as my invention:

An automobile license plate assembly comprising a plate-supporting bracket, an indicia-bearing plate, the bodies of both said bracket and said plate being perforated, a bolt projected through the perforations and tightened to secure the plate to the bracket, said plate including a second perforation spaced from the bolt-receiving perforation therein, a ribbon of metal threaded through the bolt-receiving perforations in said bracket and said plate and through said second perforation in the plate, said ribbon extending in uninterrupted continuity on the back of said plate, and a sealing device uniting the ends of the ribbon on the front of the plate, said assembled ribbon and sealing device carrying supplemental indicia visible on the front of the plate in common with the indicia immediately borne by the plate.

WILLIAM H. RITCHIE.